UNITED STATES PATENT OFFICE.

ALBRECHT SCHMIDT, OF HÖCHST-ON-THE-MAIN, AND GEORG KRÄNZLEIN, OF SINDLINGEN, NEAR HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MANUFACTURE OF AZO DYESTUFFS OF THE ANTHRAQUINONE SERIES AND PROCESS OF MAKING SAME.

1,028,139.  Specification of Letters Patent. Patented June 4, 1912.

No Drawing.  Application filed September 27, 1911. Serial No. 651,639.

*To all whom it may concern:*

Be it known that we, ALBRECHT SCHMIDT, Ph. D., chemist, and GEORG KRÄNZLEIN, Ph. D., chemist, citizens of the Empire of Germany, residing at Höchst-on-the-Main and Sindlingen, near Höchst-on-the-Main, respectively, in the Province of Hesse-Nassau and Kingdom of Prussia, Germany, have invented certain new and useful Improvements in the Manufacture of Azo Dyestuffs of the Anthraquinone Series and Processes of Making Same, of which the following is a specification.

By combining the diazo derivatives obtainable from aminoanthraquinonesulfonic acids with aceto-acetic arylamids, azo dyestuffs of great brilliancy are obtained, having the general formula:

in which A stands for an anthraquinonesulfonic residue and R for an aryl residue. Thus, for instance, the azo dyestuff from aminoanthraquinone-sulfonic acid $NH_2(2)$-$SO_3(3)$ obtainable by sulfonating 2-aminoanthraquinone and aceto-acetic anilid dyes wool and silk an extremely pure yellow shade.

Example: 64.0 kg. β-aminoanthraquinonesulfonate of sodium are rubbed together with concentrated hydrochloric acid until a thick paste is obtained, which is then diluted with 400 liters of water and cooled. While stirring, a solution of 12 kg. of sodium nitrite in 50 liters of water is allowed to drop in until the diazotizing is completed. The resulting paste is then run into a solution, rendered alkaline with soda, of 30 kg. of aceto-acetic anilid in 400 liters of spirit, care being taken that the mixture always remains alkaline. It is then quickly heated, and the product is filtered out and washed with water; if necessary with spirit. The yellow dyestuff thus obtained is, when dry, a yellow powder, difficultly soluble in hot water with a yellow color, soluble in concentrated sulfuric acid with an orange-red color, which may be directly rubbed to a paste and used in coloring. It yields on wool and silk a pure greenish-yellow color of remarkable fastness to milling.

Instead of the aminoanthraquinone-monosulfonic acids, the aminoanthraquinone-disulfonic acids may also be used.

Having now particularly described our invention what we claim is:

1. The herein-described new process for the manufacture of azo dyestuffs having the general formula:

in which A stands for an anthraquinonesulfonic residue and R for an aryl residue, which consists in combining diazotized aminoanthraquinonesulfonic acid with an aceto-acetic-arylid.

2. As new products the azo dyestuffs, obtained by combining diazotized aminoanthraquinonesulfonic acid with an aceto-acetic arylid, having the general formula:

$$A.N=N.C_3H_4O.CO.NH.R$$

in which A means an anthraquinone-sulfonic acid residue and R means an aryl residue, dyeing wool and silk yellow shades of great fastness.

3. As a new product the azo dyestuff obtained from diazotized 2-aminoanthraquinone-3-sulfonic acid and aceto-acetic anilid, being when dry, a yellow powder, difficultly soluble in hot water with a yellow color, soluble in concentrated sulfuric acid with an orange-red color and dyeing wool and silk greenish-yellow tints of great intensity and a good fastness to light and water.

In testimony whereof, we affix our signatures in presence of two witnesses.

ALBRECHT SCHMIDT.
GEORG KRANZLEIN.

Witnesses:
 JEAN GRUND,
 CARL GRUND.

Copies of this patent may be obtained for five cents each, by addressing the "Commissioner of Patents, Washington, D. C."